BEST AVAILABLE COPY

United States Statutory Invention Registration

[11] Reg. Number: H89

[45] Published: Jul. 1, 1986

Harville et al.

[54] APPLE JUICE CLARIFICATION BY USING SILICA HYDROGELS

[75] Inventors: Cathy L. Harville, Glen Burnie; Thomas E. Williams, Pasadena, both of Md.

[73] Assignee: W. R. Grace & Co., New York, N.Y.

[21] Appl. No.: 767,993

[22] Filed: Aug. 20, 1985

[51] Int. Cl.[4] ..... A23L 2/00; C12H 1/00

[52] U.S. Cl. ..... 426/423; 426/330.5

*Primary Examiner*—John F. Terapane
*Assistant Examiner*—Susan Wolffe
*Attorney, Agent, or Firm*—Jill H. Krafte

[57] ABSTRACT

A process for removing turbidity from apple juices is disclosed; said process comprising treatment of said juices with silica hydrogel and filtering through a diatomaceous earth filtering medium.

4 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPLE JUICE CLARIFICATION BY USING SILICA HYDROGELS

BACKGROUND OF THE INVENTION

The development of haze in fruit beverages, particularly apple juice, has long been a distinct problem, since both product aesthetics and taste are affected by it. Fruit juices are turbid by nature, and the flocculation which develops after storage compounds the degree of haziness encountered in such products. It is believed that proteins in association with polyphenols are primarily responsible for the haze formation in fruit juices and the prior art abounds with processes designed to result in haze removal and stabilization upon storage of fruit juices.

To a significant extent, the haze problem in fruit beverages has been treated through the use of enzymes which hydrolyze proteins which normally form haze with the phenolic components of the fruit preparation. Such beverages include, for example, apple, cranberry, grape, citrus fruit, peach, pear, plum, apricot and nectarine juices. Prior art documenting the use of these protein decomposing enzymes can be found in the form of U.S. Pat. Nos. 995,826; 3,055,757; 3,597,219 and 3,597,220. However, such enzymatic treatment of beverages is not advantageous. The decomposition and removal of protein also reduce the nutritive value and have a deleterious effect on the flavor of beverages. Further, the remaining enzymes might adversely affect the quality of the beverages. For example, a decomposition product of the enzyme tends to be associated with polyphenols and causes haze or turbidity when fruit juices are stored for prolonged periods.

Another approach to the haze problem in fruit beverages has been and continues to be the the use of adsorbents. Adsorbents which has been proposed in the prior art include polyvinyl pyrrolidone as taught in U.S. Pat. No. 2,698,550 and water-insoluble polymers of vinylpyrrolidone, i.e., polyvinyl polypyrrolidone according to U.S. Pat. Nos. 2,875,062; 2,939,791 and 2,947,633. In U.S. Pat. No. 3,940,498, haze control agents comprising polyamides such as NYLON 66 blended with synthetic magnesium silicates are described, and these may be used in conjunction with other haze control agents such as hectorite and acid-activated bentonites as well as with the protein modifying enzymes, all of which are taught in U.S. Pat. No. 3,251,693. Furthermore, the haze control agents taught in U.S. Pat. No. 3,940,498 may also be used as components of a blend with other components, including filter aids such as perlite or diatomite.

One particularly useful adsorbent used in various forms as a haze control agent in fruit beverages as well as alcoholic beverages has been silica. Various patents teach the use of silica in a sol form as an effective haze control agent, by itself or in conjunction with other agents. Silica aquasols, generally known as silica sols, are colloidal solutions of silicon dioxide in water. In U.S. Pat. No. 4,027,046, teachings are found which indicate the effectiveness of fining protein-containing beverages with an aluminate-modified silica sol. In addition, U.S. Pat. No. 4,109,017 describes clarifying fruit juice with pectinase, with subsequent settling taking place in the presence of silica sol. In U.S. Pat. No. 4,211,799, a juice clarified with pectinase is stabilized against subsequent turbidification by post treatment of the juice with silica sol.

Other prior art teaches the use of silica in a gel form as an effective haze control agent for alcoholic beverages such as beer. Silica gel, an amorphous silica colloid in which the dispersed phase has combined with the continuous phase to produce a viscous, jelly-like product, is ordinarily prepared by the acidification of sodium silicate. In U.S. Pat. No. 2,316,241, beer is treated with an "alkalized silica gel," i.e., a silica gel which is treated with alkaline liquids before said silica gel has had an opportunity to shrink upon drying. Further, in U.S. Pat. No. 3,617,301, a process to prevent haze formation in beer is taught, said process comprising treatment with a silica hydrogel of high surface area. U.S. Pat. No. 3,436,225 teaches silica gel used in conjunction with alcoholic beverage clarification; it combines aluminum silicates with silica gel, claiming to be able to reduce the silica gel requirement.

Prior art documentation of the silica gel application in beverage clarification is generally limited to use in beer clarification, and is characterized by the need to combine the silica adsorbent with some other component, either by simultaneous treatment using the silica-containing blend or with a separate silica treatment step.

It is therefore an object of the present invention to provide a clarification agent which will not require blending with any other agents to effectively remove turbidity in fruit beverages, particularly apple juice.

It is a further object of the present invention to provide a single component clarification agent which will effectively remove haze in apple juice without affecting its properties, namely pH and color. These and other objects will become apparent as the description of the invention proceeds.

BRIEF DESCRIPTION OF THE INVENTION AND DRAWING

The present invention relates to a process for clarifying apple juice. More specifically, the invention teaches a one-component silica hydrogel system which is highly effective in removing haze from and stabilizing apple juice without affecting the juice's properties, namely pH and color.

FIG. 1 is a graph depicting the results of treating apple juice with the compositions of this invention, in terms of haze formation after heat/chill cycling.

DETAILED DESCRIPTION OF THE INVENTION

Figure 1:
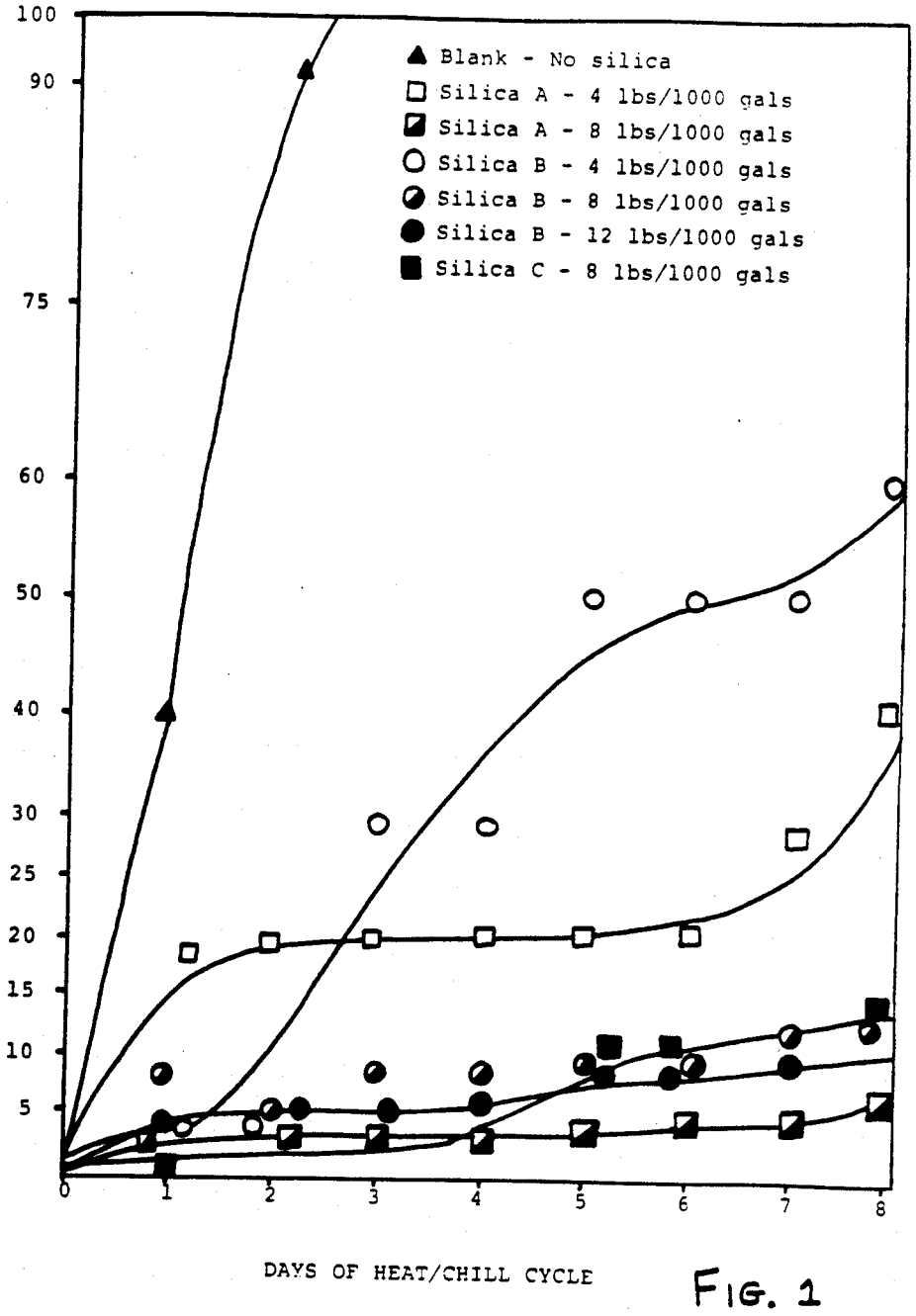

Various apple juice manufacturers have experienced haze formation in processed apple juice. Excess foam during bottle filling and high juice pH (pH 3.8) from York apples are indicators of a subsequent haze problem. It is generally believed that the haze formation in the apple juice may be caused by proteinaceous material and/or protein/polyphenol complexes. Processed apple juice unacceptable to the marketplace due to haze and cloudiness was obtained and processing with silica gel adsorbents as described herein. The described processing treatment was found to solve the haze problem encountered in apple juice production.

Standard methods for preparing the silica may be used. Conventionally, the process of preparing the gel involves mixing an alkali metal silicate with a mineral acid or with carbon dioxide to form a silica hydrosol. Illustrative silicates include sodium silicate and potassium silicate, of which sodium silicate is preferred because of its favorable economic factor. Suitable mineral acids include sulfuric and phosphoric acids, of which sulfuric acid is generally employed. The resulting hydrosol is allowed to set to a hydrogel and the pH reduced, if necessary, to less than 5. Next, the hydrogel is broken up and washed with an appropriate liquid to remove undesirable impurities and impart specific properties. It is dried and then ground or simultaneously dried and ground to a desirable particle size, depending on the use to which it is to be put. Processes for preparation of silica hydrogels may vary in certain parameters depending on the end-product characteristics required, but the basic procedure followed in the preparation of hydrogels is well known and amply documented in the prior art. The preferred silica hydrogen for use in this invention will have a total volatiles content at 1750° F. of between about 25 and 75% preferably about 35 to 62%. The preferred hydrogel is characterized by a surface area of between about 200 and 900 square meters per gram.

The silica hydrogels used in the Examples of the present invention were prepared according to procedures described in U.S. Pat. Nos. 4,153,680 and 4,303,641. Three basic batches were prepared, which are hereinafter referred to as Silicas A, B and C and which are characterized in Table I below.

TABLE I

| Silicas: | A | B | C |
|---|---|---|---|
| Properties: | | | |
| % Total Volatiles @ 1750° F. | 62.63 | 35.55 | 61.82 |
| Surface Area ($m^2$/gm) | 490.00 | 253.00 | 762.00 |
| Pore Volume - $H_2O$ (cc/gm) | 1.32 | 0.40 | — |
| pH (5% slurry) | 5.92 | 8.50 | 4.05 |
| C.C. 50% PT, ($\mu$) | 12.09 | — | 16.13 |
| % $Na_2O$ | .065 | .019 | .014 |
| % $SO_4$ | .013 | .004 | .026 |
| % Moisture @ 105° C. | 50.51 | 33.72 | 60.41 |
| Pore Volume - $N_2$ (cc/gm) | 1.04 | .91 | .75 |
| Apparent Bulk Density (gm/cc) | .332 | .328 | .284 |
| Cen Den (gm/cc) | .571 | — | — |
| % $SiO_2$ (dry basis) | 99.87 | 99.57 | 99.73 |
| % C | .13 | — | — |
| Microtrac Particle Size Distr. (ave, $\mu$) | 15.20 | 14.81 | 18.10 |
| As (ppm) | — | .5 | <3 |
| Pb (ppm) | — | 1.0 | <5 |
| Heavy Metals (ppm) | — | 5.0 | <30 |
| % $Al_2O_3$ | — | — | .0035 |
| Wet Screen (325 mesh, % thru | 97.9 | 98.6 | 98.3 |

Silica loadings of up to 12 to 15 pounds of the silica hydrogel per thousand gallons of the beverage to be treated may be used, although it is preferred to use a silica loading of about 3 to 5, preferably 4, pounds. Contact time, preferably with stirring, should be at least about 5 to 15 minutes. The beverage may also be treated with gelatin, the solids allowed to settle out, and the juice decanted off. The decanted beverage is then filtered through a diatomaceous earth filtering medium.

The examples which follow, while in no way intended to be limiting, will further aid in the understanding of this invention. The apple juice testing samples of Examples 1–6 were contacted at varying loadings with the silica samples characterized in Table I and were subsequently filtered out in a diatomaceous earth filtration step. The treated juice was then subjected to heat/chill cycling for observation of haze formation. The results are shown in Table II.

The following procedure was used in Examples 1 through 6. The apple juice sample was heated on a hot plate to 110°–125° F. maximum. Silica hydrogel was then added at the loading indicated in Table II and stirred for 10 minutes. Gelatin was then added at a loading of 12 oz./1000 gallons (0.09 g./liter) and stirred for another 10 minutes. At that point the stirring was stopped to allow the gelatin to settle for 30–60 minutes. The juice was decanted off the top. To that juice mixture, 2.32 gms. of Celite Standard Super-Cel (Johns-Manville Products Corp.) was added as a body feed. Filtration was done using the Walton DE Filter (filter area 35.3 $cm^2$). Since the juice was not filtered under pressure, the pre-coat (Standard Super-Cel) was circulated onto the grid with the filter septem in a vertical position to insure a solid pre-coat without any chance of cracking. Once the juice was filtered, it was heated to 194° F. for pasteurization. The juice was poured into glass jars with lids and was then ready for heat/chill cycling.

Haze was measured initially, then the samples were refrigerated at 36° F. overnight. Haze was measured at 36° F., then the juice was heated to 130°–140° F. for approximately 2 hours and placed back in the refrigerator again. The haze was measured every 24 hours for 8 days during heat/chill cycling is described. Visual turbidity standards were used to judge the haze content, which ranged from 0.5–20. Above 20, values were estimated. Total opaqueness was considered to be 100.

The haze results are displayed in Table II. The haze over an 8 day heat/chill cycle was recorded for each adsorbent. A key is listed at the bottom of the table which describes the numerical results; the lower the number, the better the clarity. The contact time did not change the original pH=3.6 of the apple juice. Either basic or acidic hydrous silica gels may be used without altering juice pH.

The heat/chill cycle is a severe test, which subjects the juice to extreme temperature changes in a short period of time. If haze forming materials are present in the juice, the heat/chill cycle will precipitate them out, as it did in the blank. Good clarity after one week of the heat/chill cycle indicates that contact of the juice with silica gel removes a significant amount of haze forming materials.

A graph is provided (FIG. 1) depicting curves which define the ability of the various silica hydrogels of this invention to reduce haze formation in apple juice.

TABLE II

APPLE JUICE CLARIFICATION STUDY

| | | Heat/Chill Cycle Time | | | | | | | | |
|---|---|---|---|---|---|---|---|---|---|---|
| Chillproofer | Loading lbs/1000 gals. | Initial | 1 Day | 2 Days | 3 Days | 4 Days | 5 Days | 6 Days | 7 Days | 8 Days |
| (Blank Juice) | — | 1.0 | 40 | 90 | 100+ | 100+ | 100+ | 100+ | 100+ | 100+ |
| Example 1 Silica A | 8 lbs. | 0.75 | 3 | 2 | 2 | 2 | 3 | 4 | 4 | 5 |
| Example 2 Silica B | 12 lbs. | 0.75 | 4 | 6 | 6 | 7 | 10 | 10 | 10 | — |
| Example 3 Silica B | 8 lbs. | 0.75 | 8 | 5 | 9 | 9 | 10 | 10 | 12 | 12 |
| Example 4 Silica A | 4 lbs. | 2.0 | 18 | 20 | 20 | 20 | 20 | 20 | 30 | 40 |
| Example 5 Silica B | 4 lbs. | 2.0 | 2 | 3 | 30 | 30 | 50 | 50 | 50 | 60 |

TABLE II-continued

APPLE JUICE CLARIFICATION STUDY

| Chillproofer | Loading lbs/1000 gals. | Heat/Chill Cycle Time Initial | 1 Day | 2 Days | 3 Days | 4 Days | 5 Days | 6 Days | 7 Days | 8 Days |
|---|---|---|---|---|---|---|---|---|---|---|
| Example 6 Silica C | 8 lbs. | 1.0 | 1 | — | — | — | 11 | 11 | — | 12 |

Scale:
0.5-3 = excellent clarity
4-10 = vary good clarity
11-20 = good clarity, some cloudiness and "tindling"
20-40 = fair clarity, very cloudy, precipitation apparent
50-70 = poor clarity, very cloudy, precipitation apparent
80-100 = very poor, almost opaque, precipitation very apparent
100+ = totally opaque, large amounts of solid precipitation

What is claimed is:

1. In the process of preparing apple juices a method of clarifying and stabilizing said juices against haze formation without altering color and pH comprising the steps of contacting said beverages with silica hydrogel and subsequently filtering the beverages through a diatomaceous earth filtering medium.

2. The process of claim 1 characterized in that said silica hydrogl has a total volatiles content at 1750° F. of between 25 and 75% by weight.

3. The process of claim 1 characterized in that said silica hydrogel has a surface area of between about 200 and 900 square meters per gram.

4. The process of claim 1 wherein said apple juice is subjected to the steps of (a) heating to between 100° and 130° F., (b) treatment with said silica hydrogel at a loading of between 3 and 12 pounds per thousand gallons with stirring for 5 to 15 minutes, (c) treatment with gelatin, (d) settling and (e) filtration of decanted apple juice through a diatomaceous earth filtering medium.

* * * * *